UNITED STATES PATENT OFFICE.

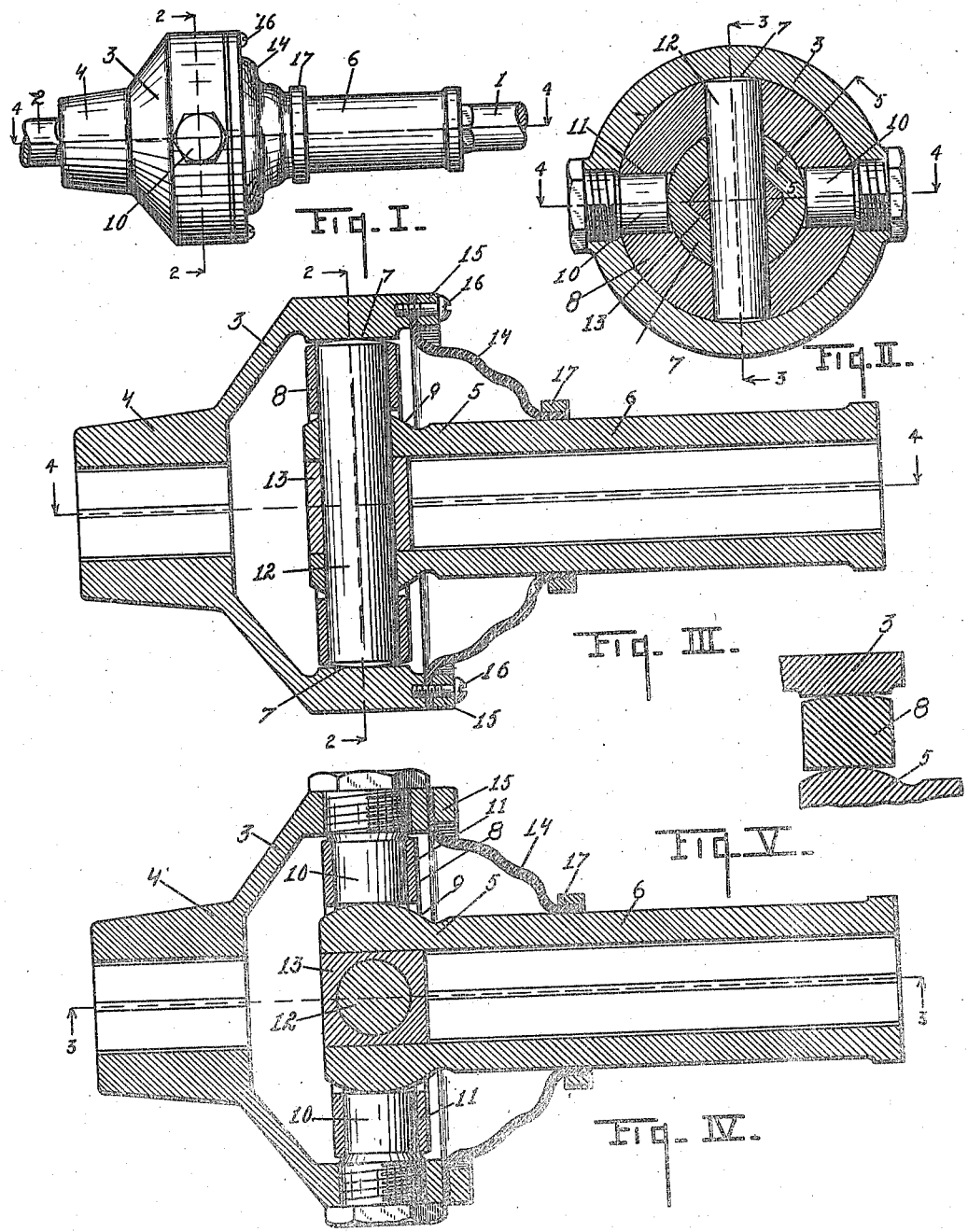

HENRY E. SPADE, OF RICHMOND, MICHIGAN, ASSIGNOR, BY MESNE ASSIGNMENTS, TO ARVAC MANUFACTURING CO., OF CHICAGO, ILLINOIS.

UNIVERSAL JOINT.

1,216,508.     Specification of Letters Patent.     Patented Feb. 20, 1917.

Application filed September 20, 1915. Serial No. 51,598.

*To all whom it may concern:*

Be it known that I, HENRY E. SPADE, a citizen of the United States, residing at Richmond, county of Macomb, State of Michigan, have invented certain new and useful Improvements in Universal Joints, of which the following is a specification.

This invention relates to improvements in universal joints.

The main object of my invention is to provide an improved universal joint which is compact and at the same time strong and durable, and one in which the parts are simple and economical to produce and easily and quickly assembled and disassembled as occasion requires.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a structure embodying the features of my invention, the shafts to be jointed being shown broken away.

Fig. II is a transverse section on a line corresponding to line 2—2 of Figs. I and III, the journals being shown in full lines.

Fig. III is a longitudinal section on a line corresponding to line 3—3 of Figs. II and IV, the journal pin being shown in full lines.

Fig. IV is a longitudinal section on a line corresponding to line 4—4 of Figs. I, II and III, the journals being shown in full lines.

Fig. V is a detail section on a line corresponding to line 5—5 of Fig. II, showing structural details.

In the drawing similar reference characters refer to similar parts throughout the several views, and the sectional views are taken looking in the direction of the little arrows at the ends of the section lines.

Referring to the drawing, 1 and 2 represent the shaft sections to be coupled.

My improved universal joint comprises a female shaft member 3 having a shank 4 adapted to receive the shaft 2, and a male member 5 having a shank 6 adapted to receive the shaft 1. The female member is preferably formed to constitute a casing member. The female member has an internal cylindrical part or surface 7 adapted to receive the annular journal member 8. This journal member is preferably spherically curved, as shown in Fig. V, so that it is an oscillating or working fit within the cylindrical part of the female member. The male member has a spherically curved head 9 disposed within the annular journal member to oscillate therein and is preferably a working fit therein.

The journals 10 for the journal member 8 are threaded into the female member 3 to engage the bearings 11 of the journal member. The journal pin 12 for the male member is disposed through the journal member and the male member head 9 at right angles to the journals 10 and is preferably of such length that it is supported against longitudinal movement by the walls of the female member.

A bearing block 13 is disposed in the end of the male member to receive the journal pin, the block being pressed into the male member.

The flexible casing member 14 is secured to the end of the female member by the clamping ring 15, the ring being secured by the screws 16, and to the shank of the male member by the clamp 17.

With the parts thus incased the joint may be filled with suitable lubricant and the bearing parts are thoroughly lubricated and protected.

The parts are very simple in form and economical to manufacture and are also very easily and quickly assembled or disassembled.

Owing to the form and arrangement of the parts they are well calculated to resist the wear and stresses to which they are subjected in use, so that the joint can be made compact and of comparatively light weight and still prove efficient and durable.

Having thus described my invention, what I claim as new and desire to secure by Letters Patent, is:

1. In a universal joint, the combination of male and female shaft members, the female shaft member having a part internally cylindrical, the male member having a spherically curved head, a spherically curved annular journal member, said journal member being adapted to oscillate within said cylindrical part of said female member, said male member being adapted to oscillate within said journal member, said parts having a working fit each within the other, journals for said journal member threaded into said female member from the outside, a journal pin for said male member disposed through said journal member and said male member head at right angles to the journals of said journal member, and a flexible casing member secured at one end to said female member and at the other to the shank of said male member.

2. In a universal joint, the combination of male and female shaft members, the female shaft member constituting a casing member and having a part internally cylindrical, the male member having a spherically curved head, a spherically curved annular journal member, said journal member being adapted to oscillate within said cylindrical part of said female member, said male member being adapted to oscillate within said journal member, said parts having a working fit each within the other, journals for said journal member threaded into said female member from the outside, and a journal pin for said male member disposed through said journal member and said male member head at right angles to the journals of said journal member.

3. In a universal joint, the combination of male and female shaft members, the female shaft member constituting a casing member and having a part internally cylindrical, the male member having a spherically curved head, said members being adapted to receive the shafts to be coupled, a spherically curved annular journal member, said journal member being adapted to oscillate within said cylindrical part of said female member, said male member being adapted to oscillate within said journal member, said parts having a working fit each within the other, journals for said journal member threaded into said female member from the outside, a journal pin for said male member disposed through said journal member and said male member head at right angles to the journals of said journal member, and a block in the head of said male member through which its said journal pin is disposed.

4. In a universal joint, the combination of male and female shaft members, the female member constituting an integral casing member, an annular member journaled within said female member to oscillate therein, said male member having a head disposed within said annular member to oscillate therein, journals for said annular member threaded into said female member from the outside, a journal pin for said male member disposed through said annular member and said male member head at right angles to the journals of said annular member, and a flexible casing member secured at one end to said female member and at the other to the shank of said male member.

5. In a universal joint, the combination of male and female shaft members, the female member being integral, an annular member disposed within said female member to oscillate therein, said male member having a head disposed within said annular member to oscillate therein, journals for said annular member threaded into said female member from the outside, and a journal pin for said male member disposed through said annular member and said male member head at right angles to the journals of said annular member.

6. In a universal joint, the combination of male and female shaft members, the female member having a part internally cylindrical, an annular journal member disposed within said female member to oscillate therein, said male member having a head disposed within said journal member to oscillate therein, journals for said journal member threaded into said female member from the outside, a journal pin for said male member disposed through said journal member and said male member head at right angles to the journals of said journal member, and a block in the head of said male member through which its said journal pin is disposed.

7. In a universal joint, the combination of male and female shaft members, the female member having a part internally cylindrical, an annular journal member disposed within said cylindrical part of said female member to oscillate therein, said male member having a head disposed within said journal member to oscillate therein, a pair of journals for said journal member carried by said female member and removable from the outside thereof, and a journal pin for said male member disposed through said journal member and said male member head at right angles to the journals of said journal member, said journal pin being retained in said journal member by the walls of said female member.

In witness whereof, I have hereunto set my hand and seal in the presence of two witnesses.

HENRY E. SPADE. [L. S.]

Witnesses:
 HELEN WATERLOO,
 FRANK A. PRIESTAP.